S. D. BALES.
ANIMAL TRAP.
APPLICATION FILED FEB. 18, 1918.
1,294,364.
Patented Feb. 11, 1919.
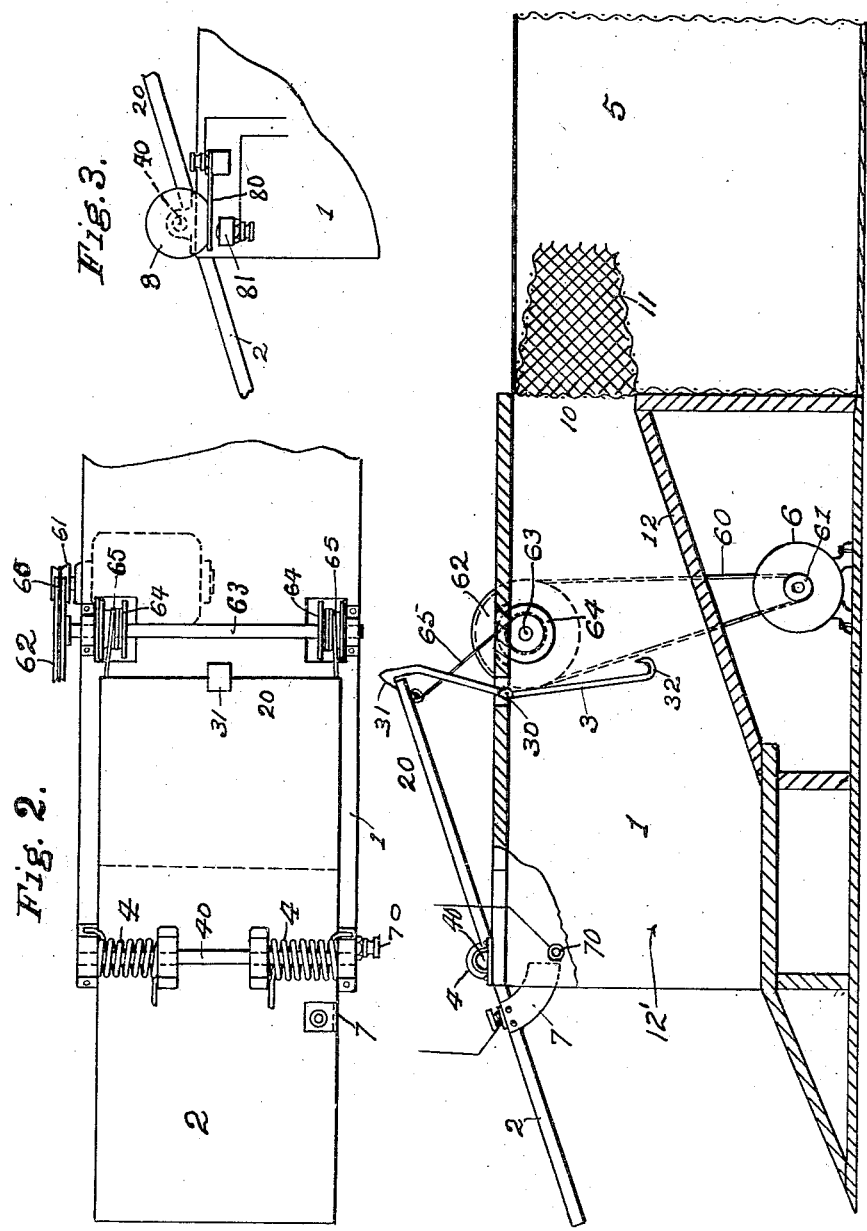
Inventor
Solomon D. Bales.
By Henry L. Reynolds
Attorney

UNITED STATES PATENT OFFICE.

SOLOMON D. BALES, OF SEATTLE, WASHINGTON.

ANIMAL-TRAP.

1,294,364. Specification of Letters Patent. Patented Feb. 11, 1919.

Application filed February 18, 1918. Serial No. 217,814.

*To all whom it may concern:*

Be it known that I, SOLOMON D. BALES, a citizen of the United States, and resident of the city of Seattle, county of King, and State of Washington, have invented certain new and useful Improvements in Animal-Traps, of which the following is a specification.

My invention relates to traps of the kind which are adapted for catching rodents and small animals. The object of my invention is to produce a trap which shall be self-setting, so that after catching one animal it will be immediately set ready for catching another. As a part of the trap I provide a cage into which the animals pass immediately upon the springing of the trap.

It is one object of my invention to produce a trap of this kind which shall be reasonable in cost and not likely to get out of order and which may be relied upon to catch as many animals as enter the same, and to pass them along into a retaining cage.

The features of my invention, which I deem to be new and upon which I desire patent, will be defined by the claims terminating the specification.

In the drawings I have shown my invention embodied in the form of construction which is now most preferred by me.

Figure 1 is a longitudinal central section taken in elevation from one side.

Fig. 2 is a top plan view and

Fig. 3 is a side view of a substitute but analogous construction of the pivot of the door and the make-and-break mechanism carried thereby.

I employ with this trap a casing 1 which in general is of a box-like form, having one end open. This open end 12' is the entrance end for the rats. At the opposite end, at 10, is an exit opening for the rats. This exit or discharge opening is further extended by means of a tunnel-like construction 11, which may be made of any suitable material and which extends well beyond the end of the casing 1. I also prefer to provide an incline 12 leading from the lowermost part of the casing upward to the exit opening 10.

A door 2 is hinged along the upper edge of the casing so that when swung downward it will close the entrance opening. This door has an extension 20 beyond the pivot, the same being adapted to be engaged by the trigger or catch lever 3. This trigger lever 3 is pivoted at 30 and has a hook end 31 above and outside the casing which is adapted to engage with the end of the extension 20 of the door to retain the same in open position.

At its lower end it is provided with a hook 32, or any other suitable means, for the retention of the bait used. A spring, or springs, 4, are employed to secure a prompt and sharp closing of the door upon its release. As herein shown, this spring is in the form of a torsion spring surrounding the shaft 40, which serves as a pivot for the door.

For holding the rats after being caught, I provide a cage 5, which may be of any size and construction desired. This cage has an opening in one side at such elevation and size as to snugly receive the projecting extension 11 which surrounds the discharge or exit opening of the trap proper. The cage is removable from the trap when it is desired to dispose of the rats caught therein.

I provide means, preferably electrically operated, by which the door will be re-set after it has been released and closed. Such means as shown consist of an electric motor 6 which is operatively connected with the door so as to open it. The means shown for connecting this motor with the door consists of a belt 60 which extends from a pulley 61 on the motor shaft to a wheel 62 carried by shaft 63 mounted on the cage near its upper edge. Upon this shaft are mounted a drum, or drums, 64, upon which is wound a cord 65 which connects with the upper end of the door.

I provide a suitable form of switch, or make-and-break mechanism, operated by the door, which is placed in the circuit of the motor so as to close the same when the door closes, thereby causing the motor to wind in on the cord 65 and thus open the door and re-set the trap.

The mechanism shown in Fig. 1 consists of a plate 7 mounted on the door and serving as one terminal for the electric circuit and a second terminal 70 which is secured upon the casing. When the trap is sprung the springs 4 will quickly close the door. At this time the rat is within the trap. This door closing behind him with a bang will scare him forward in the trap and he will pass out from the discharge or exit opening into the cage 5.

In Fig. 3 I have shown another form of make-and-break mechanism. This employs a spring bar 80 which is in the circuit and normally is out of contact with the contact point 81. On the shaft 40 of door 2 is a disk 8 bearing on spring bar 80 and having a flat side which permits the bar 80 to break contact when the door is opened to set position.

By reason of the small size of the opening through which he has passed and the difficulty of getting out of this for the return, there is small chance of his coming back through the same route. As the door closes the motor circuit is closed, thus starting the motor and raising the door again. It is thus seen that the trap is self-setting and will operate to catch as many rats as enter therein and spring the trap.

What I claim as my invention is:

1. A rat trap comprising a casing having a large entrance opening and a small exit opening, a door hinged at the upper edge of said opening and having an upward extension from its pivot, a spring acting to close said door, an electrical contact member carried by the door and a complemental contact member carried by the casing and placed to contact except with the door in locked-open position, a bait trigger adapted to be engaged to secure the upward extension of the door when the door is open, an electric motor connected with the door to open it, and a cage placed to receive the rats coming out through the exit opening.

2. A rat trap comprising a casing having one open end, a small exit opening at the upper part of the opposite end and an incline leading up to said exit opening, a tubular member forming an extension of said exit opening and projecting outward from the casing, a cage having an opening receiving said tubular extension, a door for the entrance opening, a bait trigger adapted to retain the door when opened, means acting to close the door, an electric motor connected with the door to open it, and contact making members interposed in the circuit of said motor carried by the door and the casing and engaging except when the door is open.

Signed at Seattle, Washington, this 30th day of January, 1918.

SOLOMON D. BALES.